United States Patent [19]

Patterson et al.

[11] Patent Number: 4,741,231

[45] Date of Patent: May 3, 1988

[54] TOOL FORCE SENSOR AND METHOD OF MAKING SAME

[75] Inventors: Richard L. Patterson, South Euclid; Jyoti Mukherjee, North Royalton; Edward L. Slaby, West Farmington; Robert A. Furmanek, Maple Heights, all of Ohio

[73] Assignee: The Warner & Swasey Company, Cleveland, Ohio

[21] Appl. No.: 851,833

[22] Filed: Apr. 14, 1986

[51] Int. Cl.$^4$ .............................................. B23B 13/00
[52] U.S. Cl. .......................................... 82/2 B; 73/104; 73/862.06; 73/DIG. 4; 82/24 R; 82/27; 310/338
[58] Field of Search .................. 82/2 B, 24 R, 27; 408/6, 8, 11; 409/134, 187, 188, 194, 195; 73/104, 862.06, 862.45, 862.47, 862.48, 862.64, 862.68, DIG. 4; 74/424.8 R; 310/338

[56] References Cited

U.S. PATENT DOCUMENTS

| | | | |
|---|---|---|---|
| 2,054,787 | 9/1936 | Beavers et al. | 177/351 |
| 2,978,689 | 4/1961 | Tech et al. | 408/6 |
| 3,151,258 | 9/1964 | Sonderegger et al. | 73/DIG. 4 |
| 3,596,506 | 8/1971 | Wilson | 73/133 |
| 3,602,090 | 8/1971 | Whetham | 73/862.06 |
| 3,614,488 | 10/1971 | Sonderegger et al. | 73/DIG. 4 |
| 3,698,268 | 10/1972 | Cutler | 82/2 B |
| 3,720,120 | 3/1973 | Cutler | 82/2 B |
| 3,872,285 | 3/1975 | Shum et al. | 235/151.11 |
| 4,346,444 | 8/1982 | Schneider et al. | 408/11 |
| 4,451,892 | 5/1984 | McMurtry | 82/2 B |
| 4,487,078 | 12/1984 | Schmitz et al. | 73/862.06 |
| 4,671,147 | 6/1987 | Komandori et al. | 82/36 R |

FOREIGN PATENT DOCUMENTS 3437246 4/1986 Fed. Rep. of Germany.

Primary Examiner—Frederick R. Schmidt
Assistant Examiner—Robert Showalter
Attorney, Agent, or Firm—Thomas K. Ziegler; Raymond J. Eifler

[57] ABSTRACT

A tool force sensor assembly (20) generates an electrical signal which is related to the change in force applied by a tool (24) to a workpiece (28) and is indicative of the wear condition or failure of the tool (24). The sensor assembly (20) is mounted in force transmitting relationship between a movable tool support (30, 36) and a nut member (44, 45) which is driven by screw shaft (40, 41). The sensor assembly (20) comprises a plurality of ring-shaped piezoelectric transducers (48) which are held in preselected, circumferentially spaced relationship to each other around the screw shaft (40, 41) by a retainer ring (56, 58) which is sandwiched between a pair of load distribution plates (52, 54). Fasteners (46) extend through each of the transducers (48) and mount the sensor assembly (20) between the nut member (44, 45) and the tool support (30, 36). An alternate form of the retainer ring (80) is formed by molding the transducers (48) within a layer of flexible molding material which allows the transducers (48) to seat properly against the load distribution plates (52, 54). A pair of the sensor assemblies (20) may be respectively mounted on the slide (30) and carriage (36) of a machine tool (22) in order to monitor tool force in two mutually orthogonal directions.

11 Claims, 3 Drawing Sheets

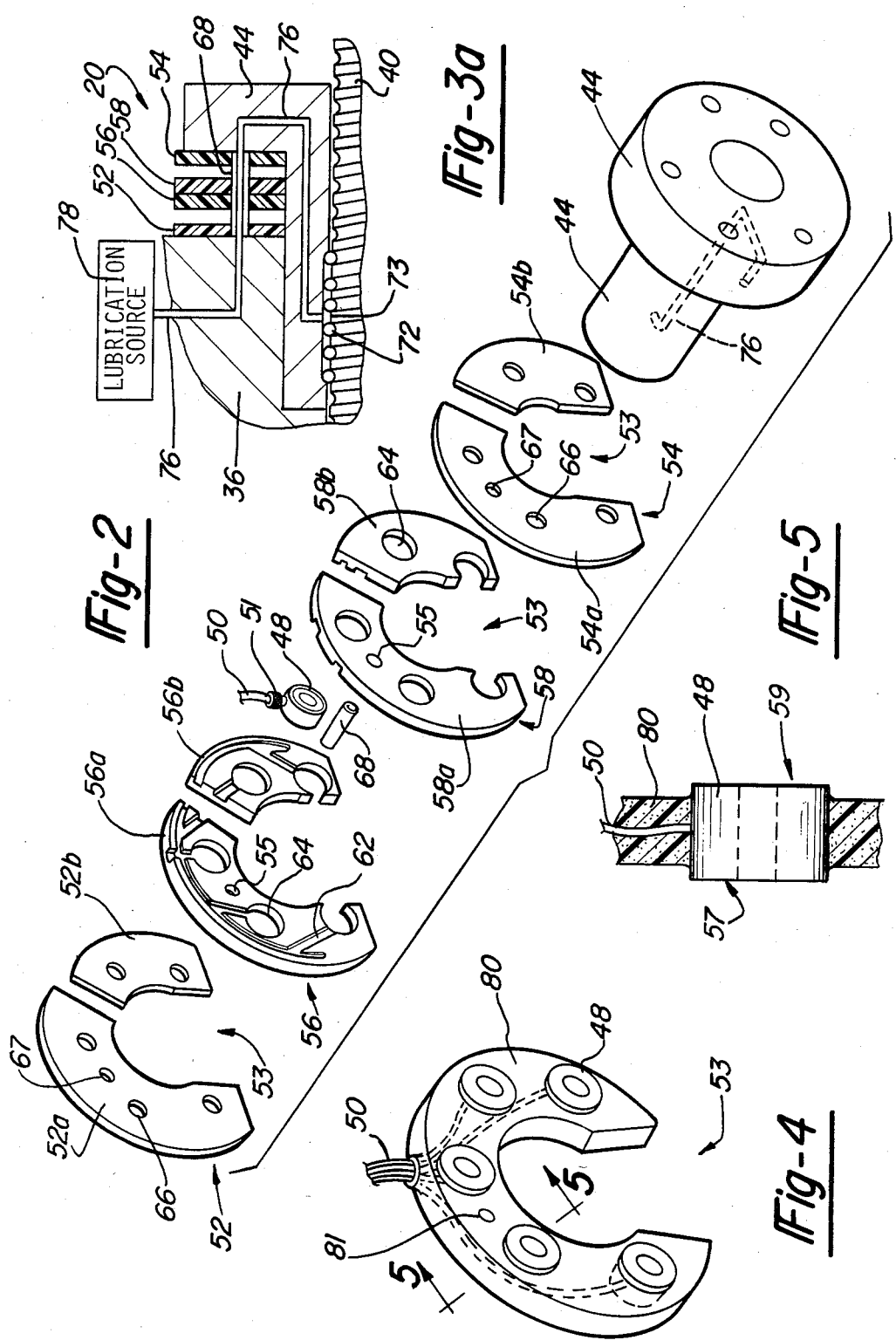

TOOL FORCE SENSOR AND METHOD OF MAKING SAME

The present invention broadly relates to devices for monitoring the wear condition and/or breakage of a tool, and deals more particularly with a device for sensing the magnitude of force applied by the tool to a workpiece as well as a method of making the sensing device.

BACKGROUND ART

It is well known that the wear condition and/or breakage of a cutting tool can be determined by monitoring the force applied by the tool to a workpiece and that cutting force changes dramatically near or at the point when the cutting tool fails. By monitoring tool force, the failure or breakage of a tool can be predicted immediately prior to tool failure so that catastrophic damage to the workpiece by an unduly worn or broken tool can be avoided.

Others in the past have employed strain gage sensors for the purpose of measuring cutting forces, and thus cutting tool wear. Examples of strain gage and similar sensors are disclosed in the following U.S. patents:

| U.S. Pat. No. | Issue Date | Title |
| --- | --- | --- |
| 2,054,787 | September 22, 1936 | Measuring Device |
| 3,596,506 | August 3, 1971 | Tool Force Monitor |
| 3,872,285 | March 18, 1975 | Control System For Sensing the Vibration and Lateral Force on a Cutting Tool |
| 4,487,078 | December 11, 1984 | Clamping-Force Transducer For Rotating Clamping Devices |

These prior strain gage sensors have several disadvantages, however. Strain gage sensors which are desirably stiff lack the needed sensitivity for accurate force measurement. On the other hand, strain gage sensors having relatively high sensitivity lack the inherent stiffness needed to avoid compromising the overall stiffness (and thus, accuracy) of the machining apparatus. Additionally, in those machine tool systems employing multiple cutting tools mounted on a turret, it is necessary to mount a strain gage sensor on each cutting station of the turret, thus necessitating a relatively large number of sensors.

SUMMARY OF THE INVENTION

In accordance with the present invention, a tool force sensor assembly is provided which generates an electrical signal which is related to the force applied by a tool to a workpiece and is indicative of the wear condition of the tool. The sensor assembly is mounted in force transmitting relationship between a movable tool support and a threaded member or nut which is driven by a motor powered screw shaft. In the case of two axis machines, such as lathes, a pair of the sensor assemblies may be employed to respectively monitor longitudinal and radial cutting tool forces. The sensor assembly comprises a plurality of ring-shaped, piezoelectric transducers which are held in preselected, circumferentially spaced relationship to each other around the screw shaft such that the force sensing axes of the transducers are held parallel to the axis of the screw shaft. The transducers are held in preselected relationship to each other by a generally O-shaped retainer ring which allows slight twisting of the transducers so that their sensing axes are forced into alignment with the axis of the screw shaft. In one embodiment, the retainer ring comprises a pair of rigid, mating rings while in an alternate embodiment the transducers are integrally molded in a ring of flexible molding material. The retainer ring is sandwiched between a pair of load distribution plates which respectively engage the tool support and the nut member. The sensor assembly is mounted on the machine tool by means of bolts which pass through the transducers. A connection extending through the sensor assembly allows the flow of lubrication from the tool support through the nut member to the screw shaft. The molded transducer retainer ring is preferably formed by introducing the transducers into a mold cavity, holding the transducers at preselected locations within the cavity by sleeving the transducers over locating pins and then introducing molding material into the mold cavity to a preselected depth so that the thickness of each of the transducers is greater than the finished retainer ring.

A primary advantage of the invention resides in the use of a sensor assembly which may be conveniently and quickly installed in existing machine tools to monitor cutting tool forces in one or more directions. By monitoring cutting forces in at least two directions, the accuracy with which machine tool failure can be predicted is substantially increased.

Another advantage of the invention resides in the use of a tool force sensor assembly which can be mounted between the ball nut and carriage or slide of an existing machine tool of the type in which the screw is lubricated through a passageway in the nut, without interfering with proper lubrication of the screw.

Another advantage of the invention lies in mounting the tool force sensor assembly at a position such that the cutting force of any of various types of cutting tools mounted in turret arrangement can be accurately measured using only one or two sensors.

Still another advantage of the invention resides in a tool force sensor assembly which mounts tool force transducers such that their sensing axes are automatically and precisely aligned parallel to the axis of travel of the cutting tool.

A further advantage of the invention resides in the use of piezoelectric transducers in the tool force sensor assembly which possess high stiffness, high sensitivity and high dynamic range.

These, and further advantages and objects of the invention, will be made clear or will become apparent during the course of a detailed description of the invention which follows.

DETAILED DESCRIPTION OF THE INVENTION

In the drawings, which form an integral part of the specification and are to be read in conjunction therewith, and in which like reference numerals are employed to designate identical components in the various views:

FIG. 2 is an exploded, perspective view of the tool force sensor assembly of the present invention in relation to a ball nut of the machine tool apparatus of FIG. 1;

FIG. 3A is a view similar to FIG. 3 but rotated to reveal a lubrication passageway;

FIG. 4 is a perspective view of an alternate form of the retainer ring having the tool force sensing transducers molded integrally therewith;

FIG. 5 is a cross-sectional view taken along the line 5—5 in FIG. 4;

Figure 1:
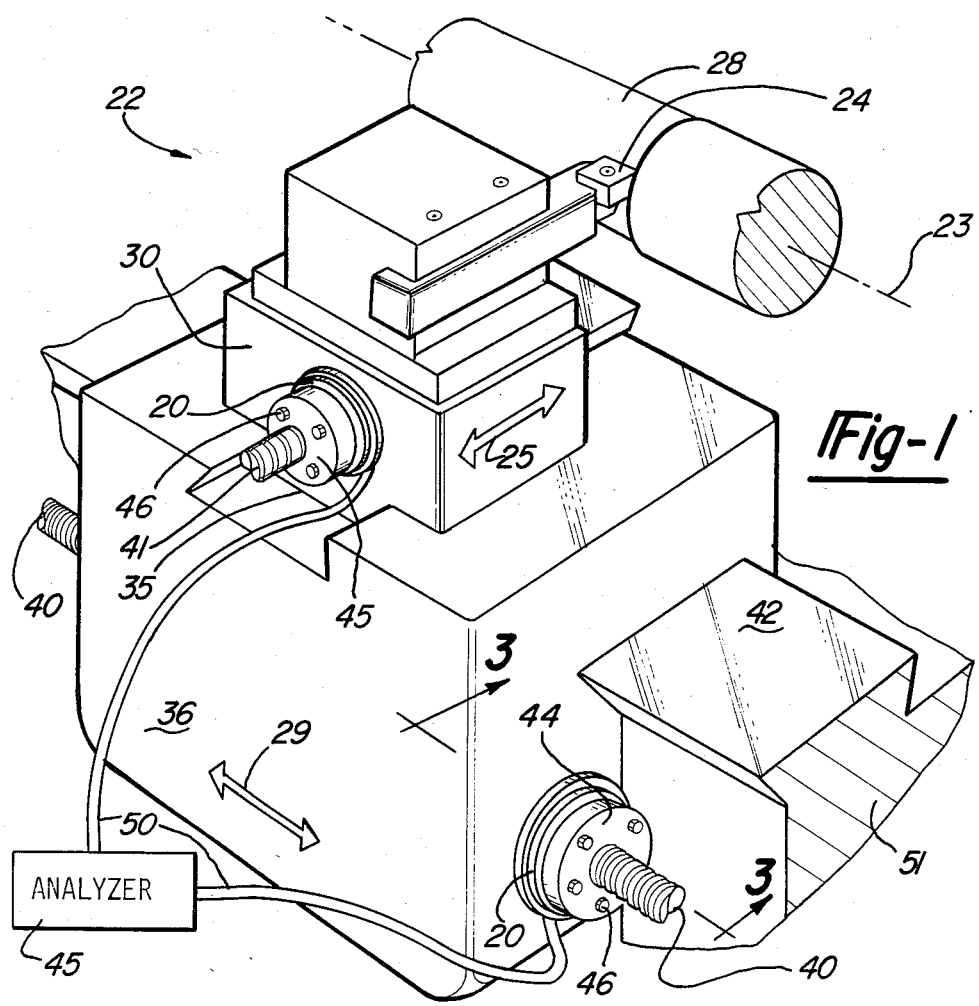
FIG. 1 is a perspective view of a two axis machine tool apparatus employing the tool force sensor assembly of the present invention to monitor cutting tool force in both radial and longitudinal directions.

Referring first to FIG. 1, the present invention broadly relates to a sensor assembly 20 for sensing the magnitude of force applied by a cutting tool 24 to a workpiece 28 which is rotated about an axis 23. The cutting tool 24 forms part of a conventional two-axis machining apparatus 22 and is secured on a slide 30 which in turn is mounted on a carriage 36 for sliding movement along a first axis 25 by means of a way 35. The carriage 36 is mounted for sliding movement along a second axis 29 on a base 51 by means of a way 42. The slide 30 and carriage 36 are thus slidable in mutually orthogonal directions (25, 29) so as to move the cutting tool 24 either radially (perpendicular) or longitudinally (parallel) relative to the axis 23 about which the workpiece 28 turns.

It is important to note here that the two-axis machining apparatus 22 depicted in FIG. 1 is merely one example of a machine tool system which can advantageously employ the sensor assembly 20 of the present invention. For example, the sensor assembly 20 of the present invention may be used in connection with three or four axis machine tools as well as non-turning machine tools such as drilling machines, milling machines, punches, cut-offs, etc. Moreover, the sensor assembly 20 may be employed to sense the magnitude of force applied by various types of cutting tools involved in numerous types of cuts, including drilling, boring, "live tooling", plunging and cut-off operations. It may thus be appreciated that the machining apparatus 22 which comprises a simple lathe is merely illustrative of the many possible applications of the tool force sensor assembly 20 of the present invention.

While the sensor assembly 20 will be referred to herein as being effective for sensing the magnitude of force applied by the cutting tool 24 to a workpiece 28 in order to monitor the wear condition of the cutting tool, it is to be understood that the sensor assembly 20 likewise monitors the cutting condition as well as breakage or other failures of the cutting tool 24.

The slide 30 and carriage 36 are respectively displaced by means of power driven screw shafts 41, 40 and threaded members in the form of ball nuts 45, 44. The screw shafts 41, 40 and ball nuts 45, 44 are of conventional design; normally the ball nuts 45, 44 are secured directly to the part which is to be displaced, i.e. the slide 30 and the carriage 36. As will be discussed later in more detail, the sensor assembly 20 of the present invention is mounted between the ball nut 44 and the carriage 36 and/or between the ball nut 45 and the slide 30. The sensor assemblies 20 are mounted such that they are in force transmitting relationship between either the slide 30 or carriage 36 and the corresponding ball nut 45, 44 so that the force applied by the cutting tool 24 to the workpiece 28 in both the radial and longitudinal directions is measured by the corresponding sensor assembly 20. It is important to note here that the mounting of the sensor assembly 20 between the ball nuts 45, 44 and the tool supports 30, 36 is merely illustrative of one manner in which the sensor assembly 20 may be mounted in force transmitting relationship between a source of motive power and the tool support. The present invention contemplates various other arrangements for mounting the sensor assembly 20 in force transmitting, force sensing relationship between the motive power source and the tool support. It is well known that the cutting condition of the tool 24 is related to changes in force applied the tool 24 to the workpiece 28. These changes in force may be in the radial or longitudinal direction and can be used to detect and predict catastrophic tool failure. The sensors 20 have electrical output leads 50 which are connected to a suitable analyzer 45 such as that available from Kistler Corporation for analyzing changes in force applied by the cutting tool 24 to the workpiece 28.

The sensor assemblies 20 mounted on the slide 30 and carriage 36 are identical and the details of their component parts are more clearly shown in FIG. 2 in relation to one of the ball nuts 44. The sensor assembly 20 is generally arcuately or O-shaped in geometry and may optionally have an opening 53 in the periphery thereof so that it can be installed over a cylindrical portion 44a of the ball nut 44. The sensor assembly 20 broadly includes a plurality of ring-shaped transducers 48, a pair of mating, arcuately-shaped retainer rings 56, 58 and a pair of load distribution plates 52, 54. The transducers 48 are of the quartz type and therefore exhibit high stiffness, high sensitivity and high dynamic range. The retainer rings 56, 58 are mounted in face-to-face, mating engagement and are provided with a plurality of circumferentially spaced apertures 64 therein. The transducers 48 are respectively received within the apertures 64; thus, the mating retainer rings 56, 58 function to hold the transducers 48 in circumferentially spaced relationship to each other. Preferably, a slight clearance exists between the transducers 48 and the apertures 64 so that the transducers 48 may twist slightly, if necessary, for purposes which will become later apparent.

The retainer rings 56, 58 are respectively segmented into two component parts 56a, 56b and 58a, 58b to facilitate their assembly around a cylindrical portion 44a of the ball nut 44. The retainer rings 56, 58 may be formed from a suitable plastic by conventional molding techniques and each includes a plurality of molded depressions 62 in the inner face thereof into which there is received electrical cables 50 and connectors 51 which connect the transducers 48 to the analyzer 45 (FIG. 1). Suitable locating means (not shown) may be provided to interconnect the retainers 56 and 58 and thereby hold them in registered position relative to each other. An additional aperture 55 in retainers 56 and 58 is provided to receive a lubrication connection tube 68 therethrough.

The load distribution plates 52 and 54 are also segmented to form component parts 52a, 52b and 54a, 54b so as to allow the plates 52, 54 to be installed over the cylindrical portion 44a of the ball nut 44. The plates 52, 54 are provided with circumferentially spaced apertures 66 aligned with openings in the transducers 48 to receive later-discussed fasteners. An additional aperture 67 is provided in plates 52, 54 to receive the lubrication connection tube 68.

It should be noted here that although the sensor assembly 20 is depicted as having five transducers 48, more or less transducers may be used. Also, a single transucer 48 may be employed and "dummy" force transmitting elements having a stiffness equivalent to that of the transducer 48 may be mounted in the remaining apertures 64 of the retainers 56, 58.

Figure 3:
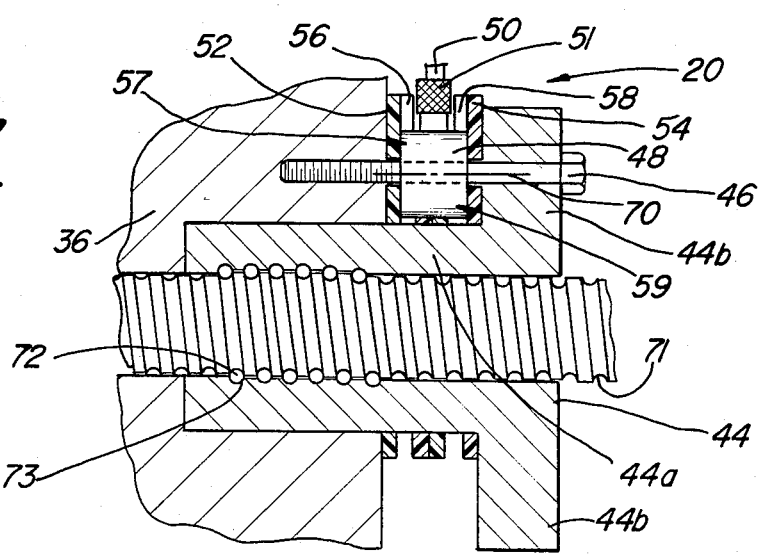
FIG. 3 is a cross-sectional view taken along the line 3—3 in FIG. 1.

Reference is now made to FIG. 3 which depicts one sensor assembly 20 installed in operative relationship between the carriage 36 and the ball nut 44. The sensor assembly 20 surrounds the cylindrical portion 44a of the ball nut 44 and is captured between an outer flange 44b of the ball 44 and a face of the carriage 36. The ball nut is provided with a central key way 73 having balls 72 which are received within the thread groove 71 of the ball screw 40. Rotation of the screw shaft 40 results in pressure being applied to the ball nut 44 through the balls 72 and this pressure is transmitted through the sensor assembly 20 to the carriage 36 to longitudinally displace the tool 24 relative to the workpiece 28.

The ball nut 44 is secured to the carriage 36 by means of a plurality of bolts 46 which extend through the flange 44b and are threadably received in the carriage 36. The bolts 46 pass through the openings in the transducers 48 as well as the apertures 64 and 66 in the previously mentioned retainer rings 56, 58 and load distribution plates 52, 54. The bolts 46 are tightened sufficiently to tightly sandwich the transducers 48 between the load distribution plates 52, 54 which engage the opposing flat faces 57, 59 of the transducers 48 and respectively and flushly contact the carriage 36 and the flange 44b. The bolts 46 are preferably tightened a sufficient amount to effectively preload the transducers 48. By virtue of the slight clearance between the exterior cylindrical surface of the transducers 48 and the retainer rings 56, 58, the transducers 48 twist as necessary so that their opposite faces 57, 59 flushly engage the load distribution plates 52, 54, thereby orienting the sensing axis 70 of the transducers 48 so that the latter are parallel with the longitudinal axis of the screw 40 (and thus, parallel with the axis 23).

Reference is now made to FIG. 3a which is a cross-sectional view similar to FIG. 3 but taken through the lubrication connection tube 68. The connection tube 68 extends through the sensor assembly 20 and forms a bridge in an oil passageway 76 which extends through the carriage 36 into the ball nut 44. The ends of the tube 68 are sealed against leakage by conventional O-rings (not shown). The passageway 76 connects the key 73 with a source of lubrication 78 which lubricates the ball 72 and screw shaft 40.

FIG. 4 depicts an alternate form of the sensor assembly 20 which includes a retainer 80 for holding the transducers 48 in their preselected, circumferentially spaced positions. The retainer 80 is formed by a later-discussed molding method and comprises a flexible material such as urethane rubber of the type available from the Devcon Corporation under the tradename Flexane 80 Liquid. The transducers 48 are integrally molded within the retainer 80, as are the electrical lead lines 50 which emanate from the retainer 80 at a common location. The retainer 80 includes a through hole 81 therein for receiving the previously discussed extension tube 68 (FIG. 2) therethrough. The bottom of the retainer 80 includes a cut-out 53 therein to allow the retainer 80 to be mounted around the cylindrical portion 44a of the ball nut 44. The retainer 80 preferably has a hardness of approximately 60-70 Shore A measured on a durometer so as to be relatively flexible. In this manner, the transducers 48 are allowed to twist or flex slightly so that their opposite faces 57, 59 flushly seat on the respectively associated load distribution plates 52, 54 (FIG. 2.) As best seen in FIG. 5, the retainer 80 has a thickness less than that of the transducers 48 so that the transducers 48 protrude slightly from the retainer 80; in this manner, the retainer 80 is slightly spaced from, and therefore does not interfere with, the load distribution plates 53, 54.

It may be readily appreciated that since the retainer 80 is somewhat flexible, it is not necessary to form the retainer 80 in segments, as in the case of the assembly formed by the retainers 56, 58 (FIG. 2) since the retainer 80 can be deformed by twisting or pulling it in order to mount it over the cylindrical portion 44a of the ball nut 44.

OPERATION

Referring to FIGS. 1, 3 and 3a, the cutting tool 24 is displaced longitudinally and radially relative to the workpiece 28 by means of the screw shafts 40 and 41. For example, as screw shaft 40 is turned, force is transmitted to the ball nut 44 and through the sensor assembly 20 to move the carriage 36 along axis 29. Movement of the carriage 36 in turn moves the cutting tool 24 in a direction parallel to the axis 23 of the workpiece 28. It may thus be appreciated that the force measured by the sensor assembly 20 is directly proportional to the cutting force applied to the workpiece 28 by the cutting tool 24. In a similar manner, the sensor assembly 20 mounted between the ball nut 45 and the slide 30 senses the magnitude of force applied by the cutting tool 24 in a direction which is perpendicular to the axis 23 of the workpiece 28. The sensors 20 respectively produce a pair of electrical signals which vary in magnitude in accordance with the radial and longitudinal cutting forces applied by the cutting tool 24 to the workpiece 28. These ectrical signals are delivered on line 50 to the analyzer 45 which analyzes such signals and produces an alarm or other output indicative of the wear condition of the cutting tool 24.

As best seen in FIG. 3A, it may be appreciated that the sensor assembly 20 does not interfere in any way with the proper lubrication of the ball nut 44 or screw shaft 40. Lubrication is supplied either by gravity or under pressure from the source 78 through the lubrication passageway 76 and tube 68 to the key way 73 where the ball 72 and shaft 40 are lubricated.

The retainers 56, 58 retain the transducers 48 in preselected positions while the sensor assembly 20 is being mounted over the cylindrical portion 44a of the ball nut 44. As best seen in FIG. 3, the retainers 56, 58 are slightly spaced from the load distribution plates 52, 54 so as to not interfere with the latter. As the bolts 46 are tightened, the opposite load bearing faces 57, 59 of the transducers 48 flushly seat against the load distribution plates 52, 54, thereby assuring that the sensing axis 70 of the transducers 48 is aligned parallel to the axis 29. The slight clearance between the transducers 48 and the retainer rings 56, 58 allow the transducers 48 to twist slightly, as may be necessary, so that the load-bearing faces 57, 59 seat flushly against the load distribution plates 52, 54. In the case of the flexible retainer ring 80 (FIG. 4), this twisting motion is provided by virtue of the flexibility of the molded material defining the retainer which allows the transducers 48 to float somewhat.

Figure 6:
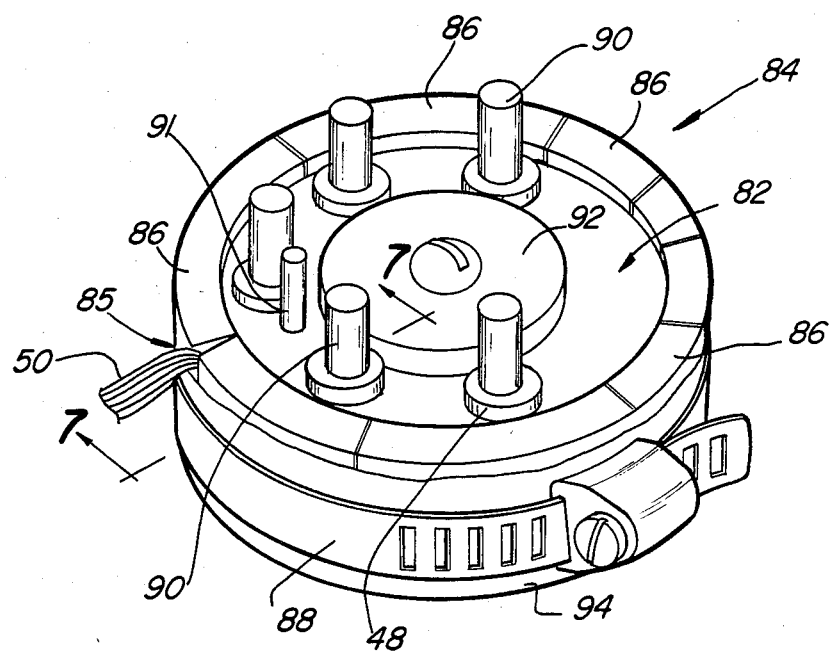
FIG. 6 is a perspective view of a mold assembly employed in a method for making the retainer ring shown in FIG. 4; and, FIG. 7 is a cross-sectional view taken along the line 7—7 in FIG. 6 and depicting a quantity of molding material having been introduced into the mold cavity.

Attention is now directed to FIG. 6 which depicts a mold assembly generally indicated by the numeral 84 used in a method for forming the retainer 80 shown in FIGS. 4 and 5. The mold assembly 84 generally includes a circular base 94 and a plurality of outer, circumferentially extending sidewall segments 86 which are held together on the base 94 by means of a circular clamp 88. The sidewall segments 86 tightly engage each other to form a continuous, circular inner wall 87. However, any two adjacent mold segments 86 may be slightly spaced to form an opening 85, or multiple openings, if necessary or desired, therebetween through which electrical leads 50 may emerge from a ring-shaped mold cavity 82 defined by the inner surface 87 of mold segments 86 and the outer circumferential surface of a central insert 92. The top of the mold cavity 82 is open to allow the introduction of molding compound therein.

As discussed above, the molding compound for forming the retainer 80 preferably comprises a urethane rubber compound in the form of a liquid resin. The Flexane compound previously mentioned consists of a resin and a hardener which are mixed together immediately prior to introducing the compound into the mold cavity 82. A suitable additive such as Flexane Flex-Add, also manufactured by Devcon Corporation, may be added to the two-part mixture of resin and hardener in order to soften the molded material.

The mold assembly 84 further includes a plurality of cylindrical locating pins 90 which are circumferentially spaced from each other or around the ring-shaped mold cavity 82. The locating pins 90 extend upwardly through the mold cavity 82 are mounted in the mold base 94 as by threads or a hole with a line fit to the pin 90. A similar, upstanding pin 91 provides a form which molds the through-hole 81 and the finished retainer 80 through which the connection tube 68 is intended to pass.

Figure 7:
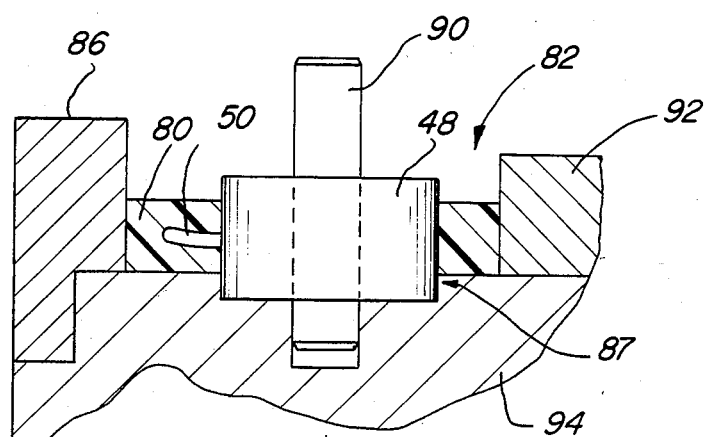

FIG. 7 is a cross-sectional view taken through the mold cavity 82 and reveals ring-shaped recesses 87 in the base 94 which surround the locating pins 90. The recesses 87 correspond in shape to the transducers 48 so as to complementally receive a portion of transducers 48 which are sleeved over the locating pins 90.

The retainer ring 80 is formed by the following method. The sidewall segments 86 are first assembled on the base 94 such that one opening 85 between two adjacent segments 86 is formed. A suitable mold release compound is applied to the inner surfaces of the mold assembly 84 defining the mold cavity 82. In a separate step, the transducer wires 50 are attached to the transducers 48 by connectors 51. The interconnections and interfaces between the wires 50, transducers 48 and connectors 51 are sealed by the application thereto of successive coats of a suitable sealant, such as M-Coat "A" or M-Coat "D" and M-Coat "B", all of which sealants are available from the Vishay Measurements Group. The use of these additional sealants is merely a precautionary step since the Flexane material surrounding the interconnections/interfaces normally provide a high degree of environmental sealing. Subsequently, the transducers 48 are then coated with a primer, such as FL-10 and/or FL-20 available from the Devcon Corporation, in order to assure proper bonding of the Flexane to the component parts. The transducers 48 are then sleeved over the locating pins 90 and the transducer wires 50 are trained around the mold cavity 82 and out through the opening 85 in the adjacent segments 86.

Any remaining open space surrounding the wires 50 as they exit through the opening 85 may be closed with any suitable deformable material such as modeling clay. The rubber molding compound is then mixed as described above and is introduced into the mold cavity. The molding material flows around the transducers 48 and forms a continuous ring corresponding to the shape of the cavity 82. The mold cavity 82 is filled with the molding compound to a height slightly below the upper surface of the transducers 48. By virtue of the fact that the bottom portion of the transducers 48 are concealed within the recesses 87 and the mold cavity 82 is filled to a level below the upper surface of the transducers 48, the final thickness of the retainer 80 is less than that of the transducers 48. The molding material is allowed to cure in the mold cavity 82 until it solidifies. After the molding compound is cured, the clamp 88 may be released and the segments 86 removed from the base 94, thereby releasing the retainer ring 80. The retainer 80 is then lifted upwardly so as to disengage the locating pins 90. The final step of the method, where necessary, consists of cutting a segment from the ring-shaped retainer 80 between adjacent transducers 48 to form the opening 53 which is required to allow the retainer 80 to be mounted on the cylindrical portion 44a of the ball nut 44.

We claim:
1. In combination with machine tool apparatus (22) of the type including a workpiece cutting tool (24) mounted on a support (36), means (42) for mounting the support (36) for movement on a base (5*i*) and along a reference axis (29), means (40, 44) adapted to be coupled with a source of motive power for driving said support (36) along said reference axis (29) and a plurality of elongate fasteners (46) connecting said driving means (40, 44) with said support (36), a tool force sensor for generating electrical signals corresponding to cutting tool force and indicative of the wear condition or failure of said tool (24), comprising:
   means (20) mounted in force-transmitting relationship between said driving means (40, 44) and said support (36) for sensing the magnitude of force applied by said driving means (40, 44) to said support (36) and for producing an electrical signal corresponding to the magnitude of sensed force, the sensed force being proportional to the force applied by said cutting tool (24) to said workpiece (28) and indicative of the wear condition or failure of said tool (24), said sensing means including a plurality of ring shaped transducers (48), each of said transducers (48) including a pair of spaced apart faces (57, 59) adapted to be loaded with a force, a force sensing axis (70) extending essentially perpendicular to said faces (57, 59) and a through hole therein, said fasteners (46) respectively extending through said through holes.

2. The device of claim 1, wherein said driving means (40, 44) is of the type which includes a screw (40) adapted to be rotated by said source of motive power and a threaded member (44) mounted on said support (36), said threaded member (44) threadably receiving said screw (40) and operative to transmit force from said screw (40) to said support (36) for driving said support (36) along said reference axis (29), and wherein said sensing means (20) includes:
   first and second spaced apart plate means (52, 54) for distributing the force applied to each of said transducers (48) respectively by said support (36) and said threaded member (44), said plate means (52, 54) including a plurality of apertures therein respectively aligned with said through holes and having said fasteners (46) extending therethrough, and means (56, 58, 80) disposed between said first and second spaced apart plate means (52, 54) for retaining said transducers (48) in circumferentially spaced, preselected positions.

3. The device of claim 2, wherein each of said transducers (48) includes a piezoelectric device characterized by high stiffness and high sensitivity.

4. The device of claim 3, wherein each of said piezoelectric devices includes quartz as the piezoelectric material.

5. The device of claim 2, wherein said retaining means (56, 58, 80) includes a generally O-shaped member having a plurality of openings (64) therein, said transducers (48) being disposed within said openings (64).

6. The device of claim 5, wherein said O-shaped member includes a pair of interconnected retainer rings (56, 58).

7. The device of claim 5, wherein said O-shaped member is defined by a flexible, molded material (80) and said transducers (48) are integrally held within said molded material (80).

8. In combination with machine tool apparatus (22) of the type including a workpiece cutting tool (24) mounted on a support (36), means (42) for mounting the support for movement on a base (51) and along a reference axis (29), a lead screw (40) adapted to be coupled with a source of rotating power for driving said support (36) along said reference axis (29), a nut (44) threadably receiving said lead screw (40) for transmitting force from said lead screw (40) to said support (36), and a lubrication passageway (76) extending through said support (36) into said nut (44) for delivering lubrication form a source (78) to said nut (44), a device for generating an electrical signal corresponding to cutting tool force and indicative of the wear condition or failure of said cutting tool (24), comprising:

means (20) mounted in interposed, force-transmitting relationship between said nut (44) and said support (36) for sensing the magnitude of force applied by said screw (40) to said support (36) and for generating said electrical signal; and means (68) extending through said sensing means (20) and connected with said passageway (76) for conveying lubrication from said support (36) to said nut (44).

9. The device of claim 8, wherein:

said sensing means (20) includes at least one transducer (48) having a pair of faces (57, 59) for receiving force loading, a pair of spaced apart load distribution plates (52, 54) respectively engaging said faces (57, 59), and means (56, 58, 80) between said plates (52, 54) for holding said transducer (48) in a preselected position between said plates (52, 54), and said lubrication conveying means (68) includes a tube extending through said plates (52, 54) and said holding means (56, 58, 80).

10. In combination with machine tool apparatus (22) of the type including a workpiece cutting tool (24) mounted on a support (36), means (42) for mounting the support for movement on a base (51) and along a reference axis (29), means (40, 44) adapted to be coupled with a source of rotating power for driving said support (36) along said reference axis (29), and a plurality of fasteners (46) extending between said driving means (40, 44) and said support (36) for connecting said driving means (40, 44) with said support (36), a device for generating an electrical signal corresponding to cutting tool force and indicating the wear condition or failure of said cutting tool (24), comprising:

a plurality of transducers (48) arranged around said driving means (40) for generating said electrical signal, each of said transducers (48) having an aperture therethrough, a pair of faces (57, 59) extending substantially parallel to each other and surrounding said aperture, said faces (57, 59) being adapted to be loaded with force, a force sensing axis (70) extending essentially perpendicular to said faces (57, 59), one of said fasteners (46) extending through each of said apertures and mounting each of said transducers (48) between said support (36) and said drive means (40, 44).

11. The device of claim 1, including a ring (80) of flexible material interconnecting said transducers (48), said ring (80) being sufficiently flexible to allow each of said transducers (48) to align its sensing axis (70) parallel to said reference axis (29).

* * * * *